Patented Aug. 4, 1925.

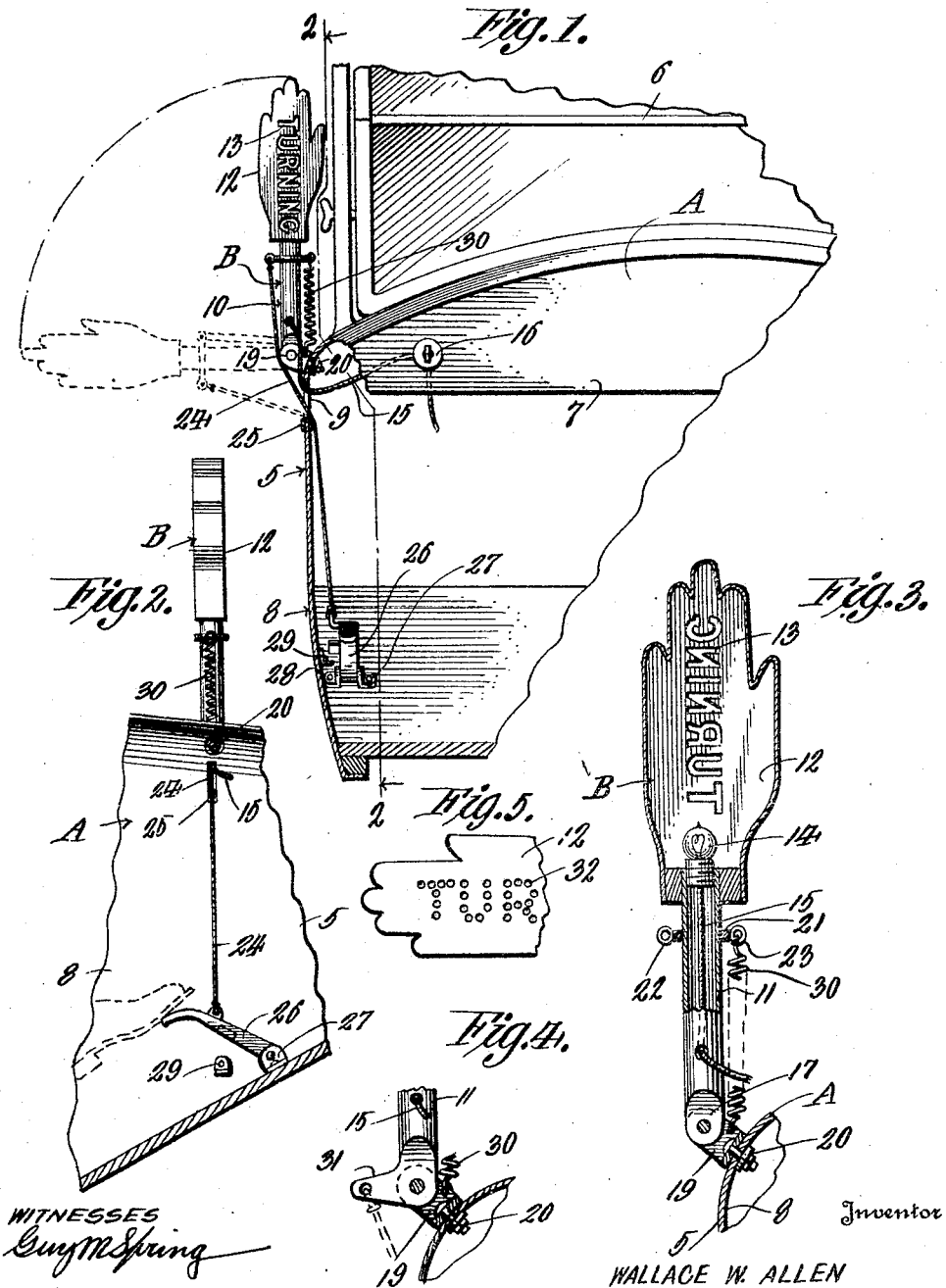

1,548,404

UNITED STATES PATENT OFFICE.

WALLACE W. ALLEN, OF STOCKTON, KANSAS.

VEHICLE SIGNAL.

Application filed October 15, 1924. Serial No. 743,810.

*To all whom it may concern:*

Be it known that I, WALLACE W. ALLEN, a citizen of the United States, residing at Stockton, in the county of Rooks and State of Kansas, have invented certain new and useful Improvements in Vehicle Signals, of which the following is a specification.

This invention appertains to attachments for automobiles and the primary object of the present invention is to provide a novel device for signalling to traffic the intended change of course of a vehicle without necessitating the driver of the vehicle signalling with his hand, thereby permitting the driver to use both hands for steering the said vehicle.

Another object of the invention is to provide a novel pivoted semaphore arm connected with one side of the vehicle in a novel manner and novel means for moving the arm to predetermined signalling positions against the tension of a spring means utilized for holding the arm in a non-signalling position.

A further object of the invention is the provision of means for operating the said arm from a novel foot pedal operating construction.

A still further object of the invention is to provide an improved direction indicator for motor vehicles of the above character, which will be durable and efficient in use, one that will be simple and easy to manufacture and one which can be placed upon the market and incorporated with a motor vehicle at a small cost.

With these and other objects in view, the invention consists in the novel construction, arrangement and formation of parts, as will be hereinafter more specifically described, claimed, and illustrated in the accompanying drawings, in which drawings, Figure 1 is a fragmentary transverse section through an automobile showing the improved signalling device incorporated therewith, the semaphore arm of the signalling device being shown in its raised inoperative signalling position, Figure 2 is a fragmentary longitudinal section through an automobile showing the improved signalling device incorporated therewith, the section being taken on the line 2—2 of Figure 1 looking in the direction of the arrows, Figure 3 is a longitudinal section through the semaphore signalling arm illustrating the means of pivotally connecting the same in position on the body of the automobile, Figure 4 is a detail fragmentary perspective view illustrating a slightly modified form of signalling arm, Figure 5 is a fragmentary view of the signalling hand showing a modified form thereof.

Referring to the drawings in detail, wherein similar reference characters designate corresponding parts throughout the several views the letter A indicates an automobile and B the improved signal incorporated therewith.

The automobile A has simply been shown to illustrate the use of my invention and can be of the desired type or make and embodies a body 5, the windshield 6 and the instrument board 7. The body 5 includes the usual side wall 8 which can be used for supporting the said signalling arm.

The improved signalling device or direction indicator comprises a semaphore arm 10 which includes the tubular supporting sleeve 11 and the hollow signalling portion 12, which is shaped to simulate the appearance of a human hand. This signalling portion 12 of the semaphore arm can be connected in any desired way with the outer end of the tubular sleeve 11 and in order to permit the semaphore arm to be readily seen in the night time as well as in the day the opposite faces of the signalling hand have struck out therefrom suitable direction indicia such as the word "Turning" indicated by the reference character 13 in the drawing. A transparent colored plate can be placed in rear of the struck out word if so desired. The outer end of the supporting tubular sleeve supports a socket for receiving any desired type of incandescent lamp 14 and it is obvious that when the circuit through this lamp is closed that the words struck out from the signalling hand will be illuminated. The electric feed cords 15 for the lamps 14 can be lead through the tubular supporting sleeve 11 into the body 5 of the automobile A through a suitable opening 9 in the side wall thereof. A switch 16 is mounted on the instrument board 7 for controlling the flow of current through the electric feed wires 15.

The inner end of the supporting tubular sleeve 11 is flattened to provide a pivot ear 17 and this pivot ear is received between the pivot lugs 18 of a supporting bracket 19, which is bolted or otherwise secured as at 20 to the side wall 8 of the vehicle body adjacent to the windshield 6.

In order to operate the semaphore arm a collar 21 is secured to the tubular supporting sleeve 11 at a point intermediate its ends and the opposite sides of the collar are provided with eyes 22 and 23. The outermost eye 22 has secured thereto a pull cable 24 which extends through the opening 9 in the body 8 over a suitable guide pulley or the like 25. The lower end of this pull cable 24 is attached to a foot pedal 26 which is rockably mounted on a suitable supporting bracket 27 carried by the floor board of the vehicle. In order to hold the pedal 26 in its lowered position a stop lug 28 can be arranged in the path of a laterally extending latch lug 29 formed on the said pedal, and by shifting the pedal laterally the lug 29 can be disposed under the lug 28.

A contractile spring 30 is utilized for normally holding the semaphore arm in its raised inoperative position alongside of the wind shield 6 and this spring has its terminals secured respectively to the eye 23 of the collar 21 and to the bracket 19. Thus when pressure is released from the foot pedal 26 the said spring will immediately return the semaphore arm to its normal position.

If so desired the pull cable 24 can be secured to a crank arm 31 instead of the eye 22. As shown this crank arm 31 can be formed on the inner end of the supporting arm 11 at the pivot point thereof.

While I use the word "Turning" as the signalling indicia it is to be understood that any other desired word can be used. The letters making up the word can be stamped out of the hand as heretofore stated or formed by making perforations in the hand as indicated by the reference character 32 through which the rays of light from the lamp 14 can be seen.

In use of the improved device, when the vehicle is going to make a turn or is going to be brought to a stop, it is merely necessary for the driver of the vehicle to press down upon the pedal 26 which will immediately swing the arm to a signalling position, where the same can be seen by the traffic both in front and in rear of the said vehicle.

Changes as to details may be made without departing from the spirit or the scope of this invention, but:—

What I claim as new is:—

In a direction indicator for automobiles, a supporting bracket, a semaphore arm including a tubular sleeve having its inner end flattened and pivotally secured to the bracket, a signalling portion, a collar secured to the sleeve remote from the flattened end, diametrically opposed eyes formed on the collar, an expansion spring secured to one eye and to the bracket, a foot pedal, a pull cable connected to the other eye and to said pedal, and extending along side of said sleeve diametrically opposite said spring and a guide through which said cable passes, said guide being located below said bracket.

In testimony whereof I affix my signature.

WALLACE W. ALLEN.